Figure 1:
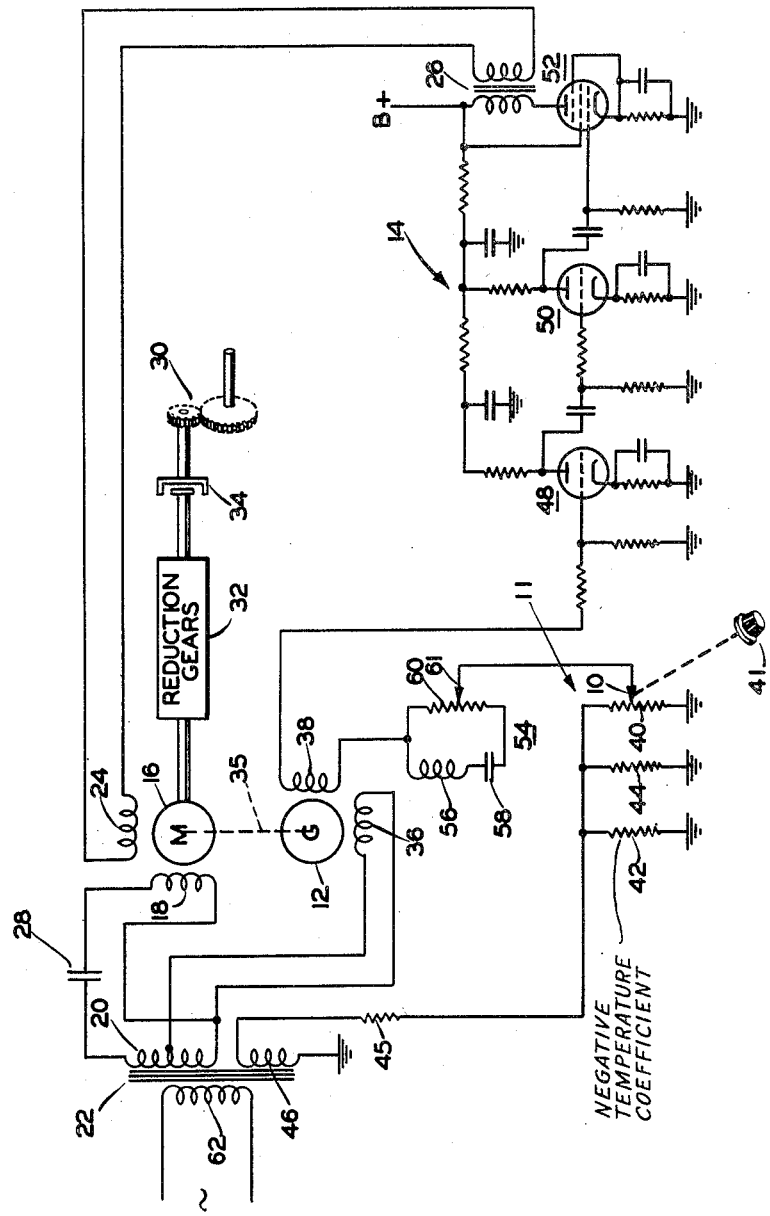

Jan. 1, 1957  C. W. McWILLIAMS  2,776,397
TEMPERATURE COMPENSATED MOTOR CONTROL SYSTEM
Filed March 4, 1954  2 Sheets-Sheet 1

INVENTOR.
CHARLES W. MCWILLIAMS
BY
Tyler S Roundy
ATTORNEY

Jan. 1, 1957  C. W. McWILLIAMS  2,776,397
TEMPERATURE COMPENSATED MOTOR CONTROL SYSTEM
Filed March 4, 1954  2 Sheets-Sheet 2
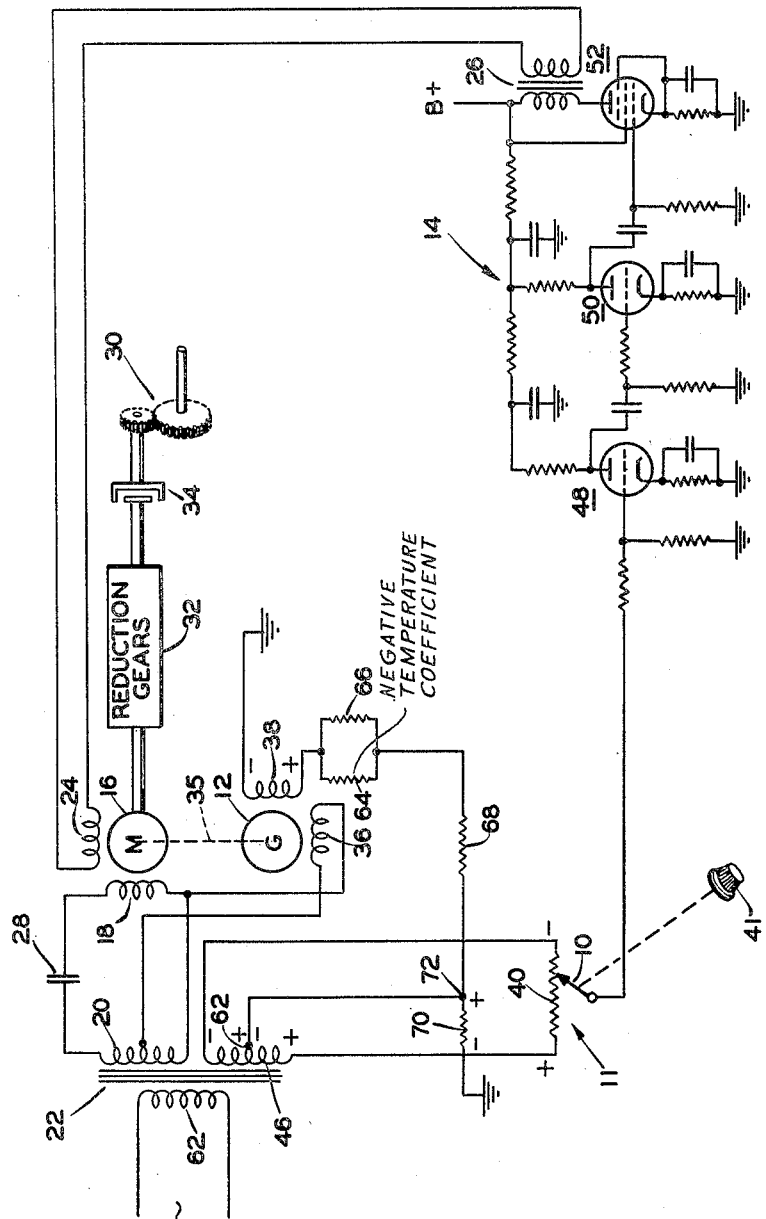
INVENTOR.
CHARLES W. McWILLIAMS
BY
Tyler S Roundy
ATTORNEY United States Patent Office 2,776,397
Patented Jan. 1, 1957

2,776,397

TEMPERATURE COMPENSATED MOTOR CONTROL SYSTEM

Charles W. McWilliams, Arlington, N. J., assignor to Bendix Aviation Corporation, Teterboro, N. J., a corporation of Delaware Application March 4, 1954, Serial No. 414,046

7 Claims. (Cl. 318—328)

The present invention relates generally to control means for motors and more particularly to means for controlling motor speed as a function of an input control signal. The present application is a continuation-in-part of my prior application Serial No. 90,313, filed April 29, 1949.

For most applications the speed at which a motor operates in response to an input signal is not critical because most systems operate on the angular displacement of a motor rather than the speed thereof. However, in certain applications, such as where a compensating signal is to be fed into a computer, for example, it is essential that motor speed accurately corresponds to the input signal and is proportional thereto, because any persistent errors in the motor speed, even if small, will be integrated over a period of time thereby providing an appreciable motor displacement error which will cause serious computer errors.

Accordingly, it is one object of the present invention to provide a novel motor control system whereby the motor is maintained at speeds very accurately corresponding to displacement signals.

Another object of the present invention is to provide a novel motor control system providing stabilized operation whereby a feed-back signal is generated in response to motor operation and mixed or combined with the input signal in opposition thereto so that a resultant signal representing the difference of the input and feed-back signals is effective to regulate the speed of the motor, provision being made to maintain the value of the resultant signal constant for a particular value of the input signal regardless of changes in temperature tending to affect the value of the feed-back signal.

These and other objects and advantages of the invention will appear more fully hereinafter from a consideration of the detailed description which follows, taken together with the accompanying drawings wherein specific embodiments of the invention are illustrated. It is to be expressly understood, however, that the drawings are for the purpose of illustration and description only, and are not intended as a definition of the limits of the invention.

Fig. 1 is a schematic circuit diagram illustrating a novel temperature-compensated motor control system in accordance with the present invention; and Fig. 2 illustrates a modification of the system of Fig. 1.

Referring to Fig. 1, there is provided an adjustable signal source for developing a variable input signal or command signal. The signal source comprises a potentiometer 11 connected across a source of A. C. voltage and having a slider 10 adjustable either manually or automatically by means (not shown) in accordance with a certain physical, mechanical or electrical quantity. The signal appearing between slider 10 and ground is directly proportional to the instantaneous position of the slider and is mixed with a signal of opposite phase developed by a generator 12, and the resultant difference signal is amplified by an amplifier, generally indicated at 14, to operate a motor 16. Motor 16 is shown as having a constant-voltage winding 18 excited from a secondary winding 20 of transformer 22, and a variable-voltage winding or control winding 24 connected across an output transformer 26 of amplifier 14. A capacitor 28 is included in the circuit of constant-voltage winding 18 in order to provide the usual phase shift for one phase of the two-phase motor. The speed and direction of the motor depends in the usual manner upon the magnitude and phase, respectively, of the signal applied to the control winding 24. If the phase of the signal applied to control winding 24 is displaced substantially 180°, then the direction of rotation of the motor will be reversed.

Motor 16 is shown as being arranged to drive an output gear 30 through a reduction gearing 32 and clutch 34 and is mounted on a common shaft 35 with generator 12. Generator 12 has an exciting winding 36 connected across one-half of the secondary winding 20 of transformer 22 and an output winding 38 connected between the input of amplifier 14 and slider 10. Slider 10 is adapted to take off a predetermined voltage appearing across potentiometer 11 which is connected in parallel relation with resistors 42 and 44 across a secondary winding 46 of transformer 22. Amplifier 14 is illustrated as a conventional three-stage amplifier comprising triodes 48 and 50 and power output pentode 52 driving output transformer 26. As such amplifiers are well known to those skilled in the art, it will not be described in detail herein.

A phase compensating network 54, consisting of a series-connected auxiliary winding 56 of generator 12 and a capacitor 58 connected in parallel relationship with a resistor 60, is connected in series with the output winding 38 of generator 12 for a purpose which will be apparent as the description proceeds. Transformer 22 has a primary winding 62 connected across a convenient source of A. C. power such as a 60 cycle or 400 cycle source.

Output gear 30 may be connected to the input of a computer (not shown) in order to feed a compensating or correction signal corresponding to a certain source of error such as wind or current, for example. An input signal corresponding to such wind or current errors is cranked into the system by manually or automatically adjusting the slider 10 a predetermined amount. Initially, the full voltage appearing between slider 10 and ground is fed to amplifier 14 causing a greatly amplified signal across the output of transformer 26. The amplified signal is applied to motor 16 to drive it in a direction depending upon the phase of the voltage appearing across potentiometer 11 to rotate gear 30 through reduction gearing 32 and clutch 34. Motor 16 will drive generator 12 through common shaft 35 to generate a feed-back signal across output winding 38, which is proportional to the speed of motor 16, winding 38 being connected in series with the input of amplifier 14 and with slider 10. The phase of the feed-back signal developed in winding 38 is such as to oppose the input signal developed between slider 38 and ground. That is, these two signals are substantially 180° out of phase with each other. Thus, when slider 10 has been adjusted to a predetermined position and the motor 16 picks up speed, the increasing feed-back signal will decrease the output from the amplifier to a point where the amplifier output is just sufficient to maintain a certain predetermined speed. This predetermined speed corresponds to the position of slider 10 and is substantially proportional to the resultant or difference signal applied to the amplifier and to the input signal developed between slider 10 and ground.

The motor speed corresponding to a particular position of slider 10 may tend to vary slightly due, for example, to fluctuations in the supply voltage or changes in the constants of the vacuum tubes and other components, but such variations in motor speed may be minimized by careful design with the provision of a sensitive generator and an amplifier 14 which has a high amplification factor or gain so that the magnitude of the resultant difference signal is relatively small in comparison with the magnitudes of the input signal developed between slider 10 and ground and of the feed-back signal developed across generator output winding 38.

If the motor speed should increase to exceed the predetermined speed, the resulting increased feed-back signal from generator 12 will cause a decrease of the output of amplifier 14 thus causing the motor to slow down. Conversely, if the motor speed should drop, the feed-back signal will decrease proportionately with the result that a larger output signal appearing from the amplifier will cause the motor to speed up. In the foregoing manner motor speed will be automatically controlled to bear a predetermined relation to the input signal developed between slider 10 and ground and to remain substantially constant for a particular position of slider 10.

It should also be noted that in addition to providing a very sensitive speed regulation for the motor, the system will also cause very rapid response to changes in the position of slider 10 and will actually act as a dynamic brake or damping system if the slider should suddenly be moved down, at which time the generated feed-back signal would actually be greater than the signal between slider 10 and ground to cause a difference voltage of opposite phase to be applied to the motor control winding 24.

The phase compensating network 54 comprises auxiliary winding 56 of generator 12 and condenser 58 connected in series relation across resistor 60 which has a slider 61. Network 54 is connected in series with the generator output winding 38. The values of the auxiliary winding and the capacitor and the position of slider 61 are selected so as to compensate for the out-of-phase components of the supply voltage appearing across winding 38. The out-of-phase components are very small compared to the feed-back signals generated by the generator but, as the signal applied to the amplifier 14 actually is only a relatively small resultant signal comprising the difference between the input signal and generated feed-back signal, the out-of-phase components may in this particular instance be sufficient to overload and overheat the amplifier. It should be noted that the out-of-phase signal generated in winding 38 is entirely independent of the speed of the generator so that once the compensating network 54 has been adjusted, it requires no further attention.

Connected in parallel with the resistance 40 of potentiometer 11 is a resistor 44 of very low value compared to the resistance 40 in order ot prevent variations in voltage across secondary winding 46 with changes in the position of slider 10. In compact electrical apparatus employing variable electric power-consuming devices such as the motor-generator unit 12, 16 heat of variable magnitude is generated and variations in ambient temperature communicated to the associated circuit components inherently tend to affect the proper operation of the circuit. Without the temperature compensation afforded by the present invention, the inherent variation in voltage of the generator output winding 38 with variation in the ambient temperature would vary the control effect of the resistance of resistor 44 in parallel combination with the resistance of potentiometer 11. In other words, the change in temperature would vary the control effect of the voltage between slider 10 and ground on the motor speed for a particular setting of slider 10, since there would be a variation in the magnitude of the generator output voltage and a corresponding variation in the magnitude of the resultant difference signal.

In accordance with one aspect of the present invention, variations of the control effect of potentiometer 11 in parallel combination with the resistance of resistor 44 due to the ambient temperature changes inherently tending to affect the generator output, are compensated for by the provision of resistor 42 having a negative temperature coefficient of resistance so that for a particular manually or automatically selected position of slider 10 the control of the voltage between slider 10 and ground will not be affected by the temperature changes. Thus in the system of Fig. 1 where resistor 42 shown connected in parallel with the parallel combination of resistor 44 and potentiometer 11, the change in voltage of the generator output winding 38 with change in temperature is accompanied by a corresponding change in the resistance of the negative temperature coefficient resistor 42, with the result that the magnitude of the signal between slider 10 and ground is varied to maintain the magnitude of the resultant or difference signal constant for the particular position of slider 10. In order to obtain the most complete compensation, resistor 42 is preferably placed as close as possible to the generator so as to be affected by substantially the same temperature changes as the generator. In those applications where the regulation of the power supply transformer is relatively good, it may be desirable to employ a resistor 45 in series with secondary winding 46.

The direction of rotation of motor 16 may be reversed by reversing the polarity of secondary winding 46 or of secondary winding 20.

Slider 10 is shown as being manually adjustable by a knob 41. It may be found convenient to connect the slider by linkage mechanism or gearing to control apparatus (not shown) in order to adjust automatically the motor speed in accordance with a variable quantity.

It is thus seen that the speed of motor 16 may be preselected in accordance with the adjustment of slider 10 and hence also the voltage between slider 10 and ground and by subtracting therefrom a voltage generated by generator 12 in winding 38 so as to drive the motor in accordance with the amplified difference of the two signals, unique provision having been made to maintain the magnitude of the difference signal constant for a particular position of slider 11 irrespective of temperature changes tending to affect the generator output.

Referring to Fig. 2, there is provided a temperature-compensated motor control system which is a modification of the system of Fig. 1. The command or control potentiometer 11 has its full resistance 40 connected in parallel across the secondary winding 46 so that the potentiometer serves as a variable source of input signals for the system. The generator 12 has one terminal of its output winding 38 connected to ground and the other terminal connected to one end of a pair of resistors 64 and 66 which are connected in parallel. Resistor 64 has a negative temperature coefficient of resistance and corresponds to the compensating resistor 42 of Fig. 1. When the ambient temperature surrounding the generator increases so as to decrease the voltage across output winding 38, the compensating resistor 64, which like resistor 42 is preferably located as close to the generator casing as is physically possible so as to be influenced by the same temperature as the generator, has its resistance correspondingly decreased.

The other ends of parallel resistors 64 and 66 are connected to a resistor 68 which in turn is connected to a grounded resistor 70. Resistors 64, 66, 68 and 70 serve as a voltage-divider to step-down the voltage generated across output winding 38. The junction point 72 between resistors 68 and 70 is connected to the center-tap 62 of the secondary winding 46 of the power supply transformer. The slider 10 of the control potentiometer 11 is connected to the input of the amplifier. The output of the amplifier supplies the variable control field winding 24 of the two-phase reversible induction motor 16 as in Fig. 1 to drive the motor and hence the generator rotor. The speed and direction of rotation of the motor depends upon the magnitude and phase, respectively, of the amplifier input signal which is communicated to the control winding 24.

When slider 10 has been manually or automatically adjusted to the midpoint of resistance 40 of the potentiometer 11, then the magnitude of the voltage across the right-hand half of potentiometer 11 is equal to the voltage across the upper half of secondary winding 46. Since these two voltages are connected in series phase opposition to the amplifier input, there will be a net voltage of zero magnitude supplied to the amplifier input. The motor will be at rest and hence there is no voltage generated across the generator output winding 38.

The moment slider 10 is adjusted in a right-hand direction to a position intermediate the midpoint and right-hand end of the resistance 40 of the potentiometer as shown in Fig. 2 where the polarities represent one half cycle of operation to indicate the relative phases of the various voltage components, then the voltage between slider 10 and the right-hand end of resistance 40 becomes less than the voltage across the upper half of winding 46. A net voltage of the same phase as the voltage across the upper half of winding 46 and of a magnitude proportional to the difference between these two voltages thus appears between junction point 72 and slider 10 and is applied to the amplifier input. The amplified version of this voltage is applied to control field winding 24 causing the motor and the generator rotor to rotate in a predetermined direction so that the voltage across output winding 38 is substantially 180° out of phase with the voltage between junction point 72 and slider 10. The system will quickly come to an equilibrium condition wherein the stepped-down generator output feed-back voltage developed between junction point 72 and ground approaches but not quite equals the magnitude of the input voltage appearing between junction point 72 and slider 10. The difference between these latter two voltages is what is applied as a resultant difference signal to the amplifier and to the motor control winding 46. The speed of the motor in the equilibrium condition will be substantially directly proportional to the extent of the displacement of slider 10 from its midpoint and to the input voltage appearing between junction point 72 and slider 10 and to the resultant or difference voltage applied to the amplifier input. With a sensitive generator and a high-gain amplifier, the magnitudes of the resultant or difference voltage may be kept small relative to the feed-back voltage between junction point 72 and ground and the input voltage between junction point 72 and slider 10.

If slider 10 is moved in a right-hand direction still farther away from the midpoint of resistance 40, then the magnitude of the input voltage between junction point 72 and slider 10 will increase as will motor speed and generator output until a new equilibrium condition is reached for the system wherein the resultant or difference signal applied to the amplifier input will be slightly larger than before. The motor will run at maximum speed in the one direction when slider 10 is positioned at the right-hand end of resistance 40.

If the motor is at rest and slider 10 is instead moved in a left-hand direction to a position intermediate the midpoint of resistance 40 and its left-hand end, then the magnitude of the voltage between slider 10 and the right-hand end of resistance 40 will now exceed the voltage across the upper half of winding 46 so that the input voltage between junction point 72 and slider 10 will be equal to the difference between the latter two voltages and will have a phase which now is the same as the phase of the voltage between slider 10 and the left-hand end of resistance 40. This full input voltage is initially applied to the amplifier input, and since it is now substantially 180° displaced in phase, the motor and generator will turn in the reverse direction. Hence, the phase of the voltage generated across winding 38 will now be displaced substantially 180°, but since the phase of the input voltage between junction point 72 and slider 10 is now also displaced 180° the stepped-down feed-back voltage between junction 72 and ground will still be displaced substantially 180° from the input voltage between junction 72 and slider 10 so that the magnitude of the resultant signal supplied to the amplifier input will still be proportional to the difference beween the magnitudes of the latter two voltages and will simply have its phase reversed to drive the motor in the reverse direction as explained above.

The operation of the system of Fig. 2 with temperature compensation is as follows. When for example the ambient temperature increases, the voltage of output winding 38 decreases for a particular position of slider 10. However, at the same time the resistance of the negative temperature coefficient resistor 64 in parallel with resistor 66 correspondingly decreases so that the stepped-down generator feedback voltage appearing between junction 72 and ground remains constant for the particular slider position regardless of changes in temperature, which is also true of the magnitude of the resultant or difference voltage applied to the amplifier. Hence, motor speed for a particular position of the slider remains unaffected by changes in temperature. Resistors 66, 68, 70 and potentiometer 11 may have a zero temperature coefficient of resistance. Resistors 66 and 68 in conjunction with resistor 64 serve to determine the desired change in voltage attenuation between winding 38 and junction 72 with temperature changes.

Although the invention is not limited to specific values for the various circuit components, it has been found that in one application the following approximate values yielded especially satisfactory results: 2.5 volts maximum for voltage in winding 38 for a 12-volt generator excitation; 300 millivolts maximum feed-back voltage between junction 72 and ground; 300 millivolts across each half of secondary winding 46; 6,000 ohms for resistor 66; 3,000 ohms for resistor 64 at room temperature; 1,300 ohms for resistor 68; 6,800 ohms for resistor 70; 5,000 ohms for linear potentiometer 11.

It will thus be seen that the present invention as exemplified by Figs. 1 and 2 provides a temperature-compensated motor speed control system wherein an input or command signal of one phase is connected in a series circuit with a feed-back voltage of opposite phase derived from a generator and the resultant or difference signal utilized to drive the motor the speed of which is to be controlled, temperature compensating means being provided to maintain the magnitude of the resultant or difference signal constant for a particular magnitude of input signal irrespective of temperature changes tending to destroy the accuracy of speed control.

Although two specific embodiments of the invention have been illustrated and described in detail, it is to be expressly understood that the invention is not limited thereto. Various changes can be made in the design and arrangements of the various elements without departing from the spirit and scope of the invention defined by the appended claims, as the same will now be understood by those skilled in the art.

I claim:

1. In a control system having means for maintaining the speed of operation of a motor substantially constant in response to a predetermined signal, comprising in combination with an adjustable signal source and a motor operated thereby, means driven by the motor for developing a signal proportional to the speed of operation of the motor, said means being subject to temperature changes which vary the output thereof, means for mixing both signals to effectuate a resulting signal for controlling the speed of operation of the motor, and impedance means connected to said signal source and responsive to the temperature changes affecting said driven means for maintaining the value of said resulting signal substantially constant for a particular setting of said adjustable source.

2. In a control system having means for maintaining the speed of operation of a motor substantially constant in response to a predetermined signal, comprising in combination with an adjustable signal source and a motor operated thereby, a signal generator driven by the motor for developing a signal proportional to the speed of operation of the motor, said signal generator being subject to temperature changes which vary the output thereof, means for mixing both signals to effectuate a resulting signal for controlling the speed of operation of the motor, and a resistance element connected in parallel with said signal source and responsive to temperature changes affecting said generator for maintaining the value of said resultant signal substantially constant for a particular setting of said adjustable source.

3. In a control system for maintaining the speed of operation of a motor substantially constant in response to a signal of predetermined amplitude irrespective of changes in temperature, comprising in combination with an adjustable means for providing signals of varying amplitudes and a motor operated thereby, means driven by the motor for developing signals corresponding to the speed of operation of the motor and which vary with changes in temperature, means for combining said signals to control the speed of operation of the motor thereby, and a temperature responsive impedance subject to changes in temperature of said driven means and connected to said signal means to maintain the combined signals substantially constant irrespective of changes in temperature of said driven means so that the speed of operation of said motor is substantially constant for a signal of predetermined amplitude.

4. In a control system for maintaining the speed of a motor constant in response to a predetermined magnitude of a variable control signal, the combination with an adjustable control signal source and a motor controlled thereby, means including means actuated by the motor for developing a signal substantially proportional to the speed of the motor, said signal-developing means being subject to temperature changes tending to vary the output thereof, means for algebraically adding said last-mentioned signal with said control signal to produce a resultant signal, means for applying said resultant signal to the motor to control the speed thereof, and impedance means responsive to substantially the same temperature changes as said signal-developing means for maintaining the magnitude of said resultant signal substantially constant for a particular adjustment of said adjustable control signal source.

5. In a control system for maintaining the speed of a motor constant in response to a variable command signal of predetermined selected magnitude, the combination with an adjustable source of a variable command signal and a motor controlled thereby, means controlled by the motor for developing a signal substantially proportional to the speed of the motor, said signal-developing means being subject to temperature changes tending to vary the output thereof, means for algebraically adding said last-mentioned signal with said command signal to produce a resultant signal, means for applying said resultant signal to the motor to control the speed thereof, and impedance means including temperature responsive impedance means positioned to be influenced by said temperature changes and connected in circuit with said signal developing means for maintaining the magnitude of said resultant signal substantially constant for a particular adjustment of said variable command signal source.

6. In a control system for maintaining the speed of a motor constant in response to a variable command signal of predetermined selected magnitude, the combination with an adjustable source of a variable command signal and a motor controlled thereby, means responsive to the motor for developing a signal substantially proportional to the speed of the motor, said signal-developing means being subject to temperature changes tending to vary the output thereof, means for algebraically adding said last-mentioned signal with said command signal to produce a resultant signal, means for applying said resultant signal to the motor to control the speed thereof, and impedance means including temperature responsive impedance means positioned to be influenced by said temperature changes and connected in series between said variable command signal source and said signal-developing means for maintaining the magnitude of said resultant signal substantially constant for a particular adjustment of said variable command signal source.

7. A system according to claim 4 wherein said impedance means has a negative temperature coefficient of resistance.

References Cited in the file of this patent

UNITED STATES PATENTS

| | | |
|---|---|---|
| 2,115,086 | Riggs | Apr. 26, 1938 |
| 2,417,868 | Glass | Mar. 25, 1947 |
| 2,528,467 | Bulliet | Oct. 31, 1950 |